(12) United States Patent
Guivarc'h et al.

(10) Patent No.: US 11,040,465 B2
(45) Date of Patent: Jun. 22, 2021

(54) PREFORM AND ONE-PIECE VANE FOR TURBOMACHINE

(71) Applicant: SAFRAN AIRCRAFT ENGINES, Paris (FR)

(72) Inventors: Jérémy Guivarc'h, Moissy-Cramayel (FR); Alexandre Bernard Marie Boisson, Moissy-Cramayel (FR); Thomas Alain De Gaillard, Moissy-Cramayel (FR); Gilles Pierre-Marie Notarianni, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 149 days.

(21) Appl. No.: 16/489,791

(22) PCT Filed: Feb. 19, 2018

(86) PCT No.: PCT/FR2018/050387
§ 371 (c)(1),
(2) Date: Aug. 29, 2019

(87) PCT Pub. No.: WO2018/158522
PCT Pub. Date: Sep. 7, 2018

(65) Prior Publication Data
US 2019/0381696 A1 Dec. 19, 2019

(30) Foreign Application Priority Data
Mar. 1, 2017 (FR) ...................................... 1751667

(51) Int. Cl.
*B29B 11/16* (2006.01)
*F01D 5/28* (2006.01)
(Continued)

(52) U.S. Cl.
CPC ............ *B29B 11/16* (2013.01); *B29C 70/222* (2013.01); *B29D 99/0025* (2013.01);
(Continued)

(58) Field of Classification Search
CPC ... B29B 11/16; B29C 70/222; B29D 99/0025; F01D 5/282
See application file for complete search history.

(56) References Cited

U.S. PATENT DOCUMENTS

| 4,195,396 A * | 4/1980 | Blazek ................... B23P 15/04 164/122.1 |
| 7,241,112 B2 * | 7/2007 | Dambrine ............. F04D 29/324 415/230 |

(Continued)

FOREIGN PATENT DOCUMENTS

| FR | 3035677 A1 | 11/2016 |
| FR | 3040147 A1 | 2/2017 |

(Continued)

OTHER PUBLICATIONS

International Search Report dated Jun. 13, 2018, in International Application No. PCT/FR2018/050387 (3 pages).

*Primary Examiner* — Woody A Lee, Jr.
(74) *Attorney, Agent, or Firm* — Bookoff McAndrews, PLLC

(57) ABSTRACT

A fiber preform for a turbine engine blade, the preform comprising a main fiber structure (40) obtained by a single piece of three-dimensional weaving, said main first structure (40) comprising a first longitudinal segment (41) suitable for forming a blade root, a second longitudinal segment (42) extending the first longitudinal segment (41) and suitable for forming an airfoil portion (22), and a first transverse segment (51) extending transversely from the junction (49) between the first and second longitudinal segments (41, 42) and suitable for forming a first tongue for a first platform, (Continued)

wherein the first transverse segment (51) extends axially over a length that is less than 30%, preferably less than 15%, of the length of the junction (49) between the first and second longitudinal segments (41, 42).

13 Claims, 3 Drawing Sheets

(51) Int. Cl.
  *B29C 70/22* (2006.01)
  *B29D 99/00* (2010.01)
(52) U.S. Cl.
  CPC ........ *F01D 5/282* (2013.01); *F05D 2300/603* (2013.01); *F05D 2300/6012* (2013.01)

(56) References Cited

U.S. PATENT DOCUMENTS

| | | | |
|---|---|---|---|
| 8,061,391 B2 * | 11/2011 | Dunleavy | D03D 25/005 139/384 R |
| 8,499,450 B2 * | 8/2013 | Naik | B29C 70/24 29/889.71 |
| 9,033,673 B2 * | 5/2015 | Roussille | F01D 5/147 416/229 A |
| 9,045,992 B2 * | 6/2015 | Roussille | C04B 35/571 |
| 9,062,562 B2 * | 6/2015 | Coupe | F01D 9/02 |
| 9,605,543 B2 * | 3/2017 | Nunez | C04B 35/62884 |
| 9,752,445 B2 * | 9/2017 | Watanabe | F01D 9/02 |
| 10,751,958 B2 * | 8/2020 | Kray | D03D 25/005 |
| 2007/0148000 A1 * | 6/2007 | Marusko | F01D 5/282 416/193 A |
| 2011/0311368 A1 * | 12/2011 | Coupe | C04B 35/62873 416/241 A |
| 2012/0055609 A1 * | 3/2012 | Blanchard | C04B 35/62884 156/89.11 |

FOREIGN PATENT DOCUMENTS

| | | |
|---|---|---|
| WO | 2013104852 A2 | 7/2013 |
| WO | 2016066954 A1 | 5/2016 |
| WO | 2016174343 A1 | 11/2016 |
| WO | 2016174345 A1 | 11/2016 |
| WO | 2016174346 A1 | 11/2016 |

* cited by examiner

PREFORM AND ONE-PIECE VANE FOR TURBOMACHINE

CROSS-REFERENCE TO RELATED APPLICATIONS

This application is the U.S. national phase entry under 35 U.S.C. § 371 of International Application No. PCT/FR2018/050387, filed on Feb. 19, 2018, which claims priority to French Patent Application No. 1751667, filed on Mar. 1, 2017.

FIELD OF THE INVENTION

The present disclosure relates to a fiber preform for a turbine engine blade and also to a single-piece blade made by means of such a preform, to a fan, and to a turbine engine including such a blade.

Such a preform may be used for making a single-piece blade that includes aerodynamic platforms. Such blades may in particular be fan blades for an airplane turbojet, for example.

STATE OF THE PRIOR ART

A conventional bypass turbojet has a fan from which the stream is split into a primary stream that is directed to the compressors, the combustion chamber, and then the turbines of the engine, and a bypass secondary stream that delivers the major part of the thrust.

In order to reduce the weight of turbojets and reduce the number of parts making them up, proposals have been made, in particular in international application WO 2013/104852, to use three-dimensional (3D) weaving to make composite material fan blades with integrally incorporated platforms. Such blades have the advantage of providing very good mechanical connection between the airfoil portion and the platforms. Nevertheless, it is complicated to make a fiber preform with integrally incorporated platforms by 3D weaving. Specifically, such a single-piece configuration involves causing large yarn layers to exit during the weaving in order to form the platforms, including in zones where it would nevertheless be desirable to conserve considerable thickness: thus, weaving the platforms simultaneously leads to shape and design constraints on the airfoil portion, thereby limiting optimization, and in particular aerodynamic optimization, of the airfoil portion.

Other techniques are also known in which the platforms and the body of the blade (comprising essentially the root of the blade and the airfoil portion) are woven separately, with the platforms subsequently being fitted to the main preform before or while injecting the matrix. By means of such techniques, it is possible to be completely free in designing the airfoil portion in order to optimize its functions much more easily, and in particular its aerodynamic functions. In contrast, the mechanical connection between the platforms and the blade body is weaker, since there is no textile connection between the platforms and the blade body.

There therefore exists a real need for a fiber preform, a blade, a fan, and a turbine engine that are free, at least in part, from the drawbacks inherent to the above-mentioned known techniques.

SUMMARY OF THE INVENTION

The present disclosure provides a fiber preform for a turbine engine blade, the preform comprising a main fiber structure obtained by a single piece of three-dimensional weaving, said main first structure comprising a first longitudinal segment suitable for forming a blade root, a second longitudinal segment extending the first longitudinal segment and suitable for forming an airfoil portion, and at least one transverse segment extending transversely from the junction between the first and second longitudinal segments and suitable for forming a tongue for a platform, wherein the transverse segment extends axially over a length that is less than 30% of the length of the junction between the first and second longitudinal segments. In particular, in this configuration, it is possible to consider that a first transverse segment extends transversely from the junction between the first and second longitudinal segments and is suitable for forming a first tongue for a first platform. In such a configuration, the first transverse segment extends axially over a length that is less than 30%, preferably less than 15%, of the length of the junction between the first and second longitudinal segments.

In the present disclosure, the terms "longitudinal", "transverse", "bottom", "top", and their derivatives are defined relative to the main direction of the blade; the terms "axial", "radial", "tangential", "inner", "outer", and their derivatives are defined relative to the main axis of the turbine engine. Furthermore, the terms "upstream" and "downstream" are used herein relative to the direction of advance of the weaving (arrows T in the figures).

By means of this preform, it is possible to design a single-piece blade made up of a blade root, an airfoil portion, and a platform: this single-piece design enables the weight of the blade to be greatly reduced.

Furthermore, by means of such a fiber preform, a good compromise is obtained between having design freedom available for the shape of the blade and of its airfoil portion in particular, and also having good mechanical strength for the platforms relative to the body of the blade.

Specifically, in such a configuration, the design constraint seeking to allow a sufficient number of layers of yarns to exit in order to make the transverse tongue for the platform applies only to a small zone of the airfoil portion, which is limited to a maximum of 30%, and possibly of 15%, of the axial length of the airfoil portion.

In addition, this length of the transverse segment is short enough to make it possible to select the zone of the airfoil portion that is best adapted for causing the necessary layers to exit: it is thus possible to minimize their impact on the design of the airfoil portion.

Furthermore, since the tongue is woven jointly with the blade body, it provides a support that is securely connected to the blade body, thereby reinforcing the mechanical strength of the platform fitted to such a tongue.

In certain embodiments, the main fiber structure includes a plurality of transverse segments extending transversely in the same direction from the junction between the first and second longitudinal segments and suitable for forming tongues for a common platform, wherein said longitudinal segments are spaced apart from one another. In particular, it is possible in one configuration to consider that the main fiber structure includes a second transverse segment extending transversely from the junction between the first and second longitudinal segments in the same direction as the first transverse segment, and suitable for forming a second tongue for the first platform, with the second transverse segment being situated at a distance from the first transverse segment. This provides two distinct supports between which or across which it is possible to fit a platform-forming strip, thereby reinforcing the mechanical strength of the final platform.

The term "at a distance from the first transverse segment", is used to mean that a gap is left axially between the first and second transverse segments.

In certain embodiments, this axial gap is equal to at least 15%, preferably at least 30% of the length of the junction between the first and second longitudinal segments.

In certain embodiments, the main fiber structure further includes at least one additional transverse segment extending transversely from the junction between the first and second longitudinal segments, in the direction opposite to at least one transverse segment, and suitable for forming a tongue for a second platform. In particular, it is possible in one configuration to consider that the main fiber structure has a third transverse segment extending transversely from the junction between the first and second longitudinal segments in a direction opposite to the first transverse segment, and suitable for forming a first tongue for a second platform. Such a third transverse segment may be present even in the absence of a second transverse segment. It serves to install a second platform on the side opposite from the first platform. Thus, with a plurality of transverse segments, some may extend in one determined direction, e.g. on the pressure side, and others may extend in the direction opposite to the determined direction, e.g. on the suction side, respectively for pressure-side and suction-side platforms.

In certain embodiments, the third transverse segment extends in line with the first transverse segment.

In certain embodiments, the main fiber structure also includes a fourth transverse segment extending transversely from the junction between the first and second longitudinal segments and in the direction opposite to the first transverse segment, being suitable for forming a second tongue for the second platform, wherein the fourth transverse segment extends axially over a length that is less than 30%, and preferably less than 15%, of the length of the junction between the first and second longitudinal segments, and wherein the fourth transverse segment is situated at a distance from the third transverse segment.

In certain embodiments, the fourth transverse segment extends in line with the second transverse segment.

The third and fourth transverse segments may share the same characteristics as the corresponding first and second transverse segments.

In certain embodiments, at least one transverse segment extends axially from the front end of the junction between the first and second longitudinal segments. Firstly this reduces the impact of the transverse segment on weaving strategy, and thus on the design of the airfoil portion. Specifically the thickness transition between the blade root and the airfoil portion is naturally very large at the leading edge: under such circumstances, numerous layers can naturally be caused to exit at this location and can be used for weaving the transverse segment. Secondly, it is easier to put the platform-forming strip into place, since said transverse segment can receive the end of the strip.

In certain embodiments, at least one transverse segment extends axially from the rear end of the junction between the first and second longitudinal segments. Firstly, this reduces the impact of the transverse segment on weaving strategy and thus on the design of the airfoil portion. Specifically, the thickness of the blade root is generally quite small at the trailing edge: it can thus be thickened artificially locally in order to enable a sufficient number of yarn layers to be caused to exit for weaving the transverse segment with minimum impact on the design of the airfoil portion. Secondly, it is easier to put the platform-forming strip into place, since said transverse segment can receive the end of the strip.

In certain embodiments, at least one transverse segment is formed by at least a portion of a free flap, said free flap and said second longitudinal segment being woven jointly in non-interlinked manner, said non-interlinking starting at the junction between the first and second longitudinal segments.

Such non-interlinking provides the advantage of weaving the free flap that corresponds to the transverse segment in continuity with the first longitudinal segment, so that it is structurally attached thereto, which segment is to form the blade root, i.e. the support for the blade as a whole, while taking thickness downstream from the second longitudinal segment that is to form the airfoil portion, and that therefore needs to be of smaller thickness. Such a boundary between the first and second longitudinal segments thus serves to dissociate the weaving between a region that is to become a structural portion and another region that is to become an aerodynamic portion: the thickness transition needed between these two portions is made much easier in this example insofar as separating the free flap already takes away a large part of this thickness.

In certain embodiments, the first transverse segment is formed by at least a portion of a first free flap, said first free flap and said second longitudinal segment being woven jointly in non-interlinked manner, said non-interlinking starting at the junction between the first and second longitudinal segments.

In certain embodiments, the second transverse segment is formed from at least a portion of a second free flap, said second free flap and said second longitudinal segment being woven jointly in non-interlinked manner, said non-interlinking starting at the junction between the first and second longitudinal segments.

In certain embodiments, the third transverse segment is formed by at least a portion of a third free flap, said third free flap and said second longitudinal segment being woven jointly in non-interlinked manner, said non-interlinking starting at the junction between the first and second longitudinal segments.

In certain embodiments, the fourth transverse segment is formed by at least a portion of a fourth free flap, said fourth free flap and said second longitudinal segment being woven jointly in non-interlinked manner, said non-interlinking starting at the junction between the first and second plurality segments.

In certain embodiments, the first and second free flaps are distinct and separated axially by at least one group of non-woven yarns.

In certain embodiments, the third and fourth free flaps are distinct and separated axially by at least one group of non-woven yarns.

In certain embodiments, the preform further includes at least one fiber strip, e.g. a first fiber strip, that is woven independently of the main fiber structure, that is of width substantially equal to the length of the junction between the first and second longitudinal segments, and that is suitable for forming a first platform.

In certain embodiments, the preform further includes a second fiber strip, that is woven independently of the main fiber structure, that is of length substantially equal to the length of junction between the first and second longitudinal segments, and that is suitable for forming a second platform.

In certain embodiments, the fiber strip is fitted to at least one transverse segment of the main fiber structure. In particular, the first fiber strip is fitted to the first transverse segment and/or the second transverse segment of the main fiber structure.

In certain embodiments, the second fiber strip is fitted to the third transverse segment and/or to the fourth transverse segment of the main fiber structure.

In certain embodiments, at least one fiber strip, and preferably each fiber strip, is fitted to the main fiber structure by adhesive, by stitching, or by co-injection.

In certain embodiments, at least one fiber strip is fitted to a transverse segment by being put against the bottom surface of said transverse segment. This configuration provides better mechanical strength to withstand the centrifugal forces that are applied to the platforms while the turbine engine is in operation.

In certain embodiments, the top surface of at least one fiber strip is flush with the top surface of at least one transverse segment. In this way, the top surface of the final platform is plane and regular, thereby providing good aerodynamic properties.

In certain embodiments, at least one fiber strip includes a notch of shape that matches substantially the shape of a transverse segment.

In certain embodiments, at least any one of the transverse segments may extend axially over a length that is less than 30% of the length of the junction between the first and second longitudinal segments. In particular, each transverse segment may extend axially over a length that is less than 30% of the length of the junction between the first and second longitudinal segments.

In certain embodiments, at least any one of the transverse segments extends axially over a length that is less than 15% of the length of the junction between the first and second longitudinal segments. In particular, each transverse segment may extend axially over a length that is less than 15% of the length of the junction between the first and second longitudinal segments.

In certain embodiments, the number of layers of yarns, and thus the thickness, of the second longitudinal segment varies. This makes it possible to thin down the airfoil portion in order to improve its aerodynamic performance.

In certain embodiments, the yarns used for weaving the preform are carbon fibers. Nevertheless, they could be any other kind of yarn, e.g. glass fibers or Kevlar fibers.

In certain embodiments, the weave used for the three-dimensional weaving of the preform may be of the 3D interlock type. Nevertheless, the outer surfaces of the preform may be woven essentially in two-dimensional manner, e.g. using a satin weave.

The present disclosure also provides a turbine engine blade comprising a blade root, an airfoil portion, and a platform extending transversely to the airfoil portion at the level of the junction between the blade root and the airfoil portion, said blade being made as a single piece of composite material by means of a fiber preform in accordance with any of the above embodiments, said preform being shaped in a mold and embedded in a matrix.

The above-described advantages in terms of mechanical strength, weight, cost, performance, and ease of working are obtained by means of this single-piece shape integrating at least a blade root, an airfoil portion, and a platform.

In certain embodiments, the matrix is of organic type. In particular it may be an epoxy resin.

In other embodiments, the matrix is of ceramic type.

The present disclosure also provides a turbine engine fan comprising a plurality of blades in accordance with any of the above-described embodiments.

Finally, the present disclosure also provides a turbine engine including at least one blade or a fan in accordance with any of the above embodiments.

The above-mentioned characteristics and advantages, as well as others, appear on reading the following detailed description of embodiments of the proposed preform and blade. This detailed description makes reference to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are identified using the same reference signs.

DETAILED DESCRIPTION OF EMBODIMENTS

In order to make the invention more concrete, an embodiment is described below in detail with reference to the accompanying drawings. It should be recalled that the invention is not limited to this embodiment.

Figure 1:
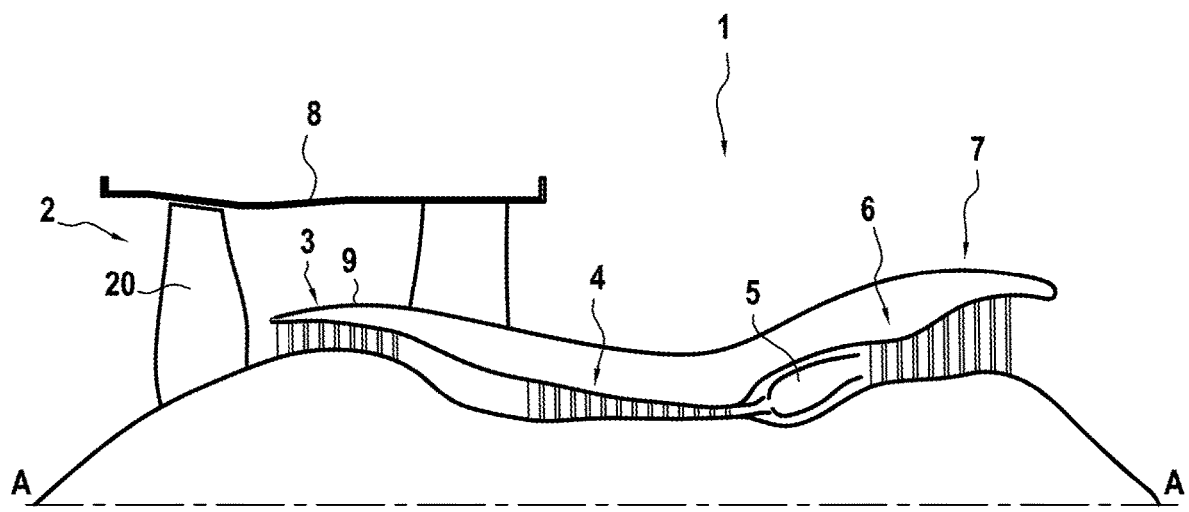
FIG. 1 is a section view of a turbine engine in accordance with the disclosure.

FIG. 1 is a view of a bypass turbojet 1 in accordance with the disclosure and shown in section on a vertical plane containing its main axis A. From upstream to downstream in the flow direction of the air stream, it comprises a fan 2, a low pressure compressor 3, a high pressure compressor 4, a combustion chamber 5, a high pressure turbine 6, and a low pressure turbine 7. In its upstream portion, the turbojet 1 has an outer casing 8 and an inner casing 9 defining two concentric flow passages, namely a primary passage I and a secondary passage II.

Figure 2:
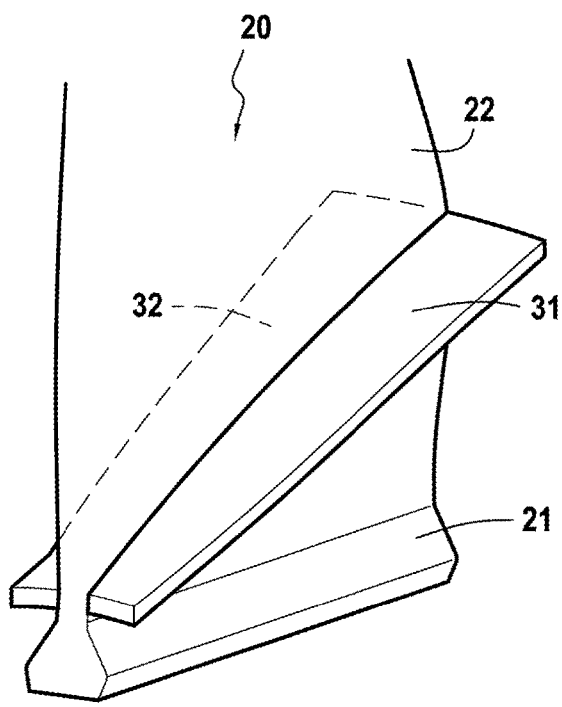
FIG. 2 is a perspective view of a blade in accordance with the disclosure.

FIG. 2 is a diagrammatic perspective view of a blade 20 of the fan 2. Such a blade 20 comprises a blade root 21 and an airfoil portion 22. The airfoil portion 22 serves mainly to perform the aerodynamic function of the blade 20, while the blade root 21 serves mainly to fasten the blade 20 and provide it with mechanical strength.

The blade root 21 has a dovetail profile enabling it to be fastened in a slot in a fan disk.

The blade 20 also has pressure-side and suction-side platforms 31 and 32 extending substantially orthogonally to the airfoil portion 22 and on either side thereof, level with the boundary blade root 21 and the airfoil portion 22. These platforms 31 and 32 serve to make up a smooth and aerodynamic inner wall for the flow passage and they provide a diameter transition from upstream to downstream across the fan 2.

In this embodiment, the blade 20 is a fan blade having a dovetail root 21 and two platforms 31 and 32. Nevertheless, in other examples, it could be some other type of blade, a stationary blade (i.e. a vane) or a moving blade, for a compressor or possibly for a turbine, or indeed for an intermediate casing or a rear casing, to mention only some examples. It could thus equally well include upper platforms or indeed fastener flanges at the root or at the tip of the blade.

Figure 3:
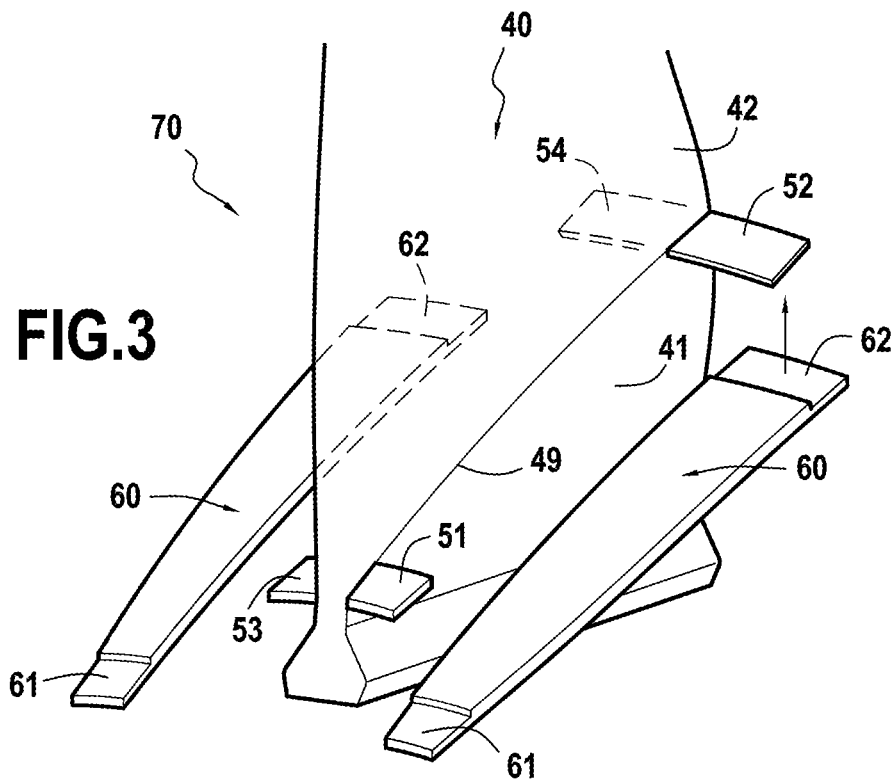
FIG. 3 is a perspective view, prior to assembly, of a preform suitable for obtaining such a blade.

FIG. 3 shows the preform 70 for making this example blade 20. It comprises a three-dimensionally woven main fiber structure 40 together with two fiber strips 60 that are likewise woven three-dimensionally, but independently of the main fiber structure 40.

The main fiber structure 40 comprises a first longitudinal segment 41 and a second longitudinal segment 42 defined by a boundary 49. The main fiber structure 40 also has four transverse segments 51, 52, 53, and 54 extending transversely from the boundary 49 that forms the junction between the first and second longitudinal segments 41 and 42.

A first transverse segment 51 extends on the pressure side from the front end of the main fiber structure 40, i.e. from the leading edge of the blade 20. Its axial length, i.e. its length along the boundary 49, is equal to about 20% of the length of the boundary 49.

A second transverse segment 52 also extends on the pressure side, but from the rear end of the main fiber structure 40, i.e. from the trailing edge of the blade 20. Its axial length, i.e. its length along the boundary 49, is likewise about 20% of the length of the boundary 49.

A third transverse segment 53 extends on the suction side opposite from and in line with the first transverse segment 51, i.e. from the front end of the main fiber structure 40. Its axial length corresponds substantially to the axial length of the first transverse segment 51.

A fourth transverse segment 54 likewise extends on the suction side opposite from and in line with the second transverse segment 51, i.e. from the rear end of the main fiber structure 40. Its axial length corresponds substantially to the axial length of the second transverse segment 51.

The weaving of this main fiber preform 40 is described below with reference to FIGS. 4A and 4B. These two figures are in longitudinal section level with the first and third transverse segments 51 and 53, i.e. in the proximity of the front edge of the main fiber structure 40. Nevertheless, the weaving is entirely analogous level with the second and fourth transverse segments 52 and 54.

Figures 4A, 4B:
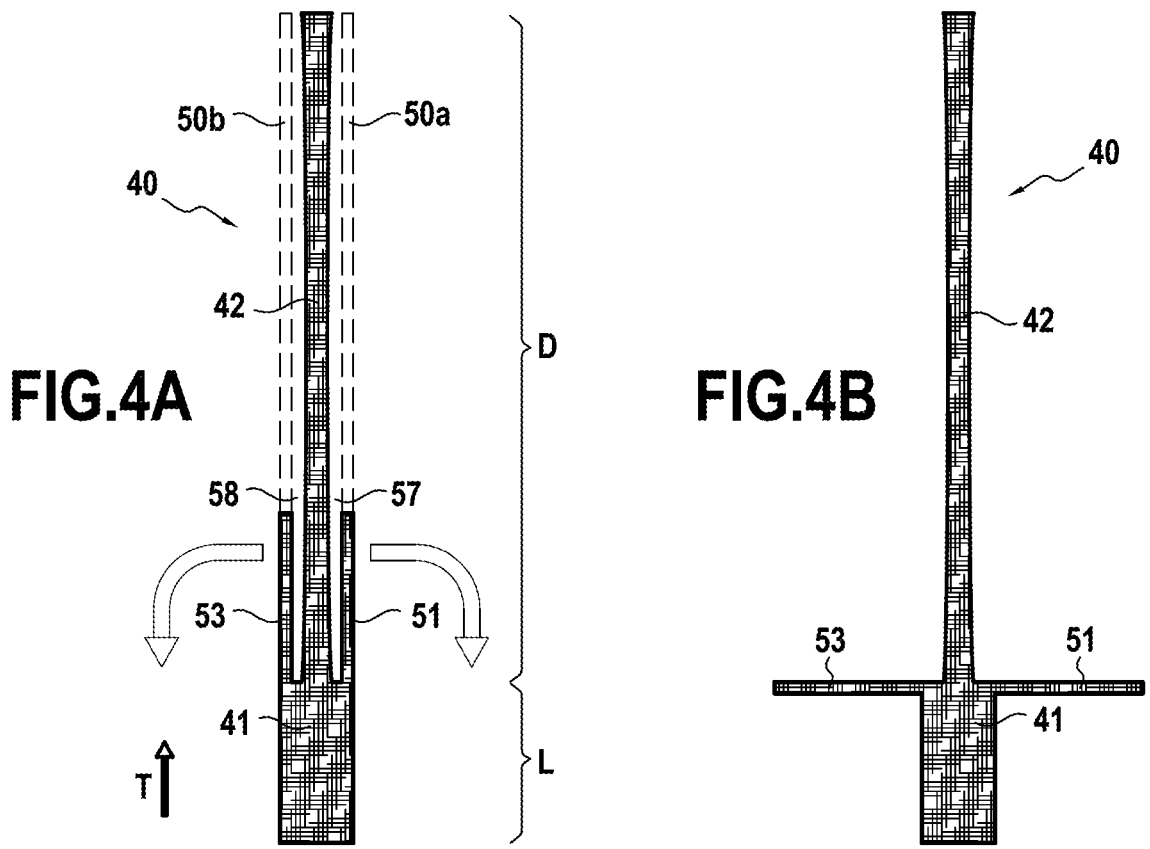
FIGS. 4A and 4B are diagrams showing the main fiber structure of the preform.

FIG. 4A shows the three-dimensionally woven main fiber structure 40. FIG. 4B shows the same main fiber structure 40 after it has been shaped. This main fiber structure 40 is described from upstream to downstream in the weaving direction T, i.e. upwards in the figures. Nevertheless, the weaving could perfectly well be made from the other end and in the opposite direction.

In this embodiment, the main fiber structure 40 is woven three-dimensionally using carbon fibers with a 3D interlock weave.

At the upstream end, the weaving begins with a zone of interlinking L in which the first longitudinal segment 41 is woven to form the root 21 of the blade 20.

Downstream from this zone of interlinking L, there begins a zone of non-interlinking D in which a first free flap 50a, a second longitudinal segment 42, and a second free flap 50b are woven jointly but in non-interlinked manner so as to leave respective planes 61 and 62 of non-interlinking.

Figure 5:
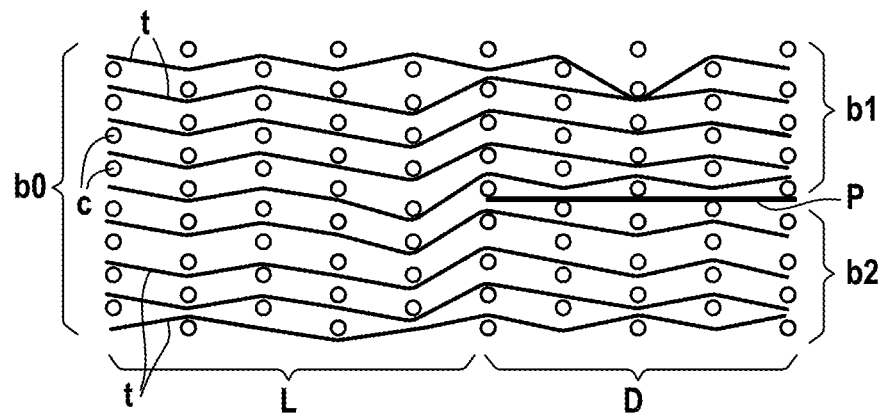
FIG. 5 shows non-interlinking in simplified manner.

Methods of weaving that make such non-interlinking possible are now well known in the field of 3D weaving. By way of illustration, FIG. 5 is a simplified diagram of such non-interlinked weaving. In the zone of interlinking L, all of the layers of warp yarns c (orthogonal to the plane of the figure) are connected to one another by weft yarns t (running along the plane of the figure), thereby forming a single strip b0. Conversely, in the zone D of non-interlinking, two strips b1 and b2 are woven jointly but in non-interlinked manner, i.e. with independent weft yarns t for each strip b1, b2, such that a plane P of non-interlinking is arranged between the two strips b1 and b2. Naturally, such an arrangement can equally well be provided in the warp direction as in the weft direction, and thus equally well for warp strands or for weft strands.

Furthermore, within this zone D of non-interlinking, layer exits are provided progressively along the weaving T between the second longitudinal segment 42 and each of the free flaps 50a, 50b.

Methods of weaving that enable such layer exits to be provided are now well known in the field of 3D weaving. Specifically, the weft yarns are caused to leave free certain warp yarns, referred to as "floated yarns" since, not being attached to any weft yarn, they "float", and can subsequently be shaved off: layers may thus be eliminated in full or in part, thereby enabling certain zones of the preform to be reduced in thickness. In this embodiment, this serves to thin down the second longitudinal segment 42 and thus the airfoil portion 22 that is made therefrom.

On this topic, it should be observed that these exits of layers are made in this example inside the main fiber structure 40 while it is being woven: the floated warp yarns are thus enclosed, i.e. hidden, between the second longitudinal segment 42 and one or the other of the free flaps 50a and 50b.

Once weaving is terminated, the free flaps 50a and 50b are cut so as to form respectively the first and third transverse segments 51 and 53. These segments are then folded outwards as shown by the arrows so as to occupy their final transverse positions: they form respective support tongues for the pressure-side and suction-side platforms 31 and 33.

Once the free flaps 50a and 50b have been cut, the floated yarns lying at the surface of the second longitudinal segment 42 become accessible and can be shaved off.

Furthermore, and in independent manner, the fiber strips 60 are woven, either three-dimensionally as in this example, or else two-dimensionally. Each of them extends over a length that corresponds to the length of the boundary 49 between the first and second longitudinal segments 41 and 42.

At its front end, the top surface of each fiber strip 60 has a first notch 61 of shape corresponding substantially to the shape of the first transverse segment 51 or of the third transverse segment 53, as the case may be. In other words, the depth of the notch 61 corresponds to the thickness of the corresponding first or third transverse segment 51 or 53; the axial length of the notch 61 corresponds to the axial length of the corresponding first or third transverse segment 51 or 53; and the transverse width of the notch 61 corresponds to the transverse width of the corresponding first or third transverse segment 51 or 53.

In the present example, the first notch 61 extends over the entire width of the fiber strip 60 in question. Thus, the fiber strip 60 possesses a width at its front end that corresponds to the transverse width of the corresponding first or third transverse segment 51 or 53.

In analogous manner, at its rear end, the top surface of each fiber strip 60 likewise includes a second notch 62 of shape that corresponds substantially to the shape of the corresponding second or fourth transverse segment 52 or 54.

In the present example, the second notch 62 extends likewise over the entire width of the fiber strip 60 in question. Thus, at its rear end, the fiber strip 60 possesses a width that corresponds to the transverse width of the corresponding second or fourth transverse segment 52 or 54.

Each fiber strip 60 is then fitted under a pair of transverse segments 51, 52 or 53, 54, with all of the transverse segments 51-54 then being received in the notches 61 or 62. Consequently, the top surface of each fiber strip 60 is flush to the top surface of the transverse segments 51-54.

Figure 6:
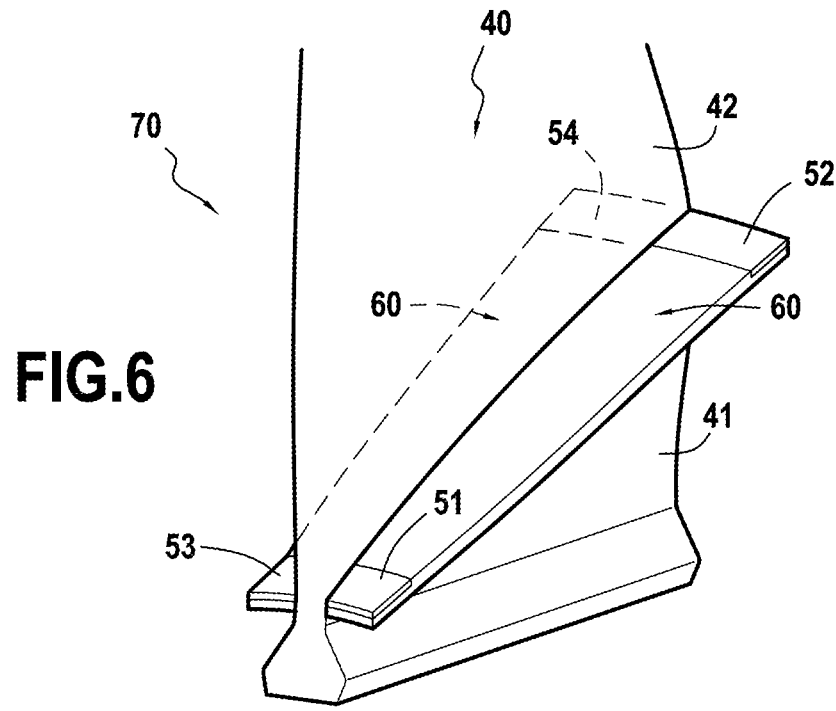
FIG. 6 is a perspective view of the preform once assembled and shaped.

As shown in FIG. 6, the preform 70 as prepared in this way may be moistened in order to soften it and make it easier to take the fibers out of register. It is then placed in a forming mold having an inside space that matches the shape desired for the preform 70.

The preform 70 is then dried in order to stiffen it, thereby blocking the shape as imposed by the shaping. Finally, the preform 70 is placed in an injection mold having the dimensions desired for the final blade 20, with a matrix being injected into the mold, specifically an epoxy resin. By way of example, such injection may be performed by the known resin transfer molding (RTM) technique. At the end of this step, a blade 20 is thus obtained that is made of composite material comprising a preform 70 woven out of carbon fibers that is embedded in an epoxy matrix. The blade 20 may possibly be finished off by machining steps.

In the present embodiment, each fiber strip 60 is adhesively bonded under the transverse segments 51-54. Nevertheless, in other embodiments, the fiber strip 60 could merely be put into place in the injection mold together with the main fiber structure 40, with the fiber strip 60 being bonded on the main fiber structure 40 as a result of this co-injection when the matrix solidifies.

Although the present invention is described with reference to specific embodiments, it is clear that modifications and changes may be undertaken on the embodiments without going beyond the general ambit of the invention as defined by the claims. In particular, individual characteristics of the various embodiments shown and/or mentioned may be combined in additional embodiments. Consequently, the description and the drawings need to be considered in a sense that is illustrative rather than restrictive.

It is also clear that all of the characteristics described with reference to a method can be transposed singly or in combination to a device, and vice versa, all of the characteristics described with reference to a device can be transposed, singly or in combination to a method.

The invention claimed is:

1. A fiber preform for a turbine engine blade, the preform comprising a main fiber structure obtained by a single piece of three-dimensional weaving, said main first structure comprising:
   a first longitudinal segment suitable for forming a blade root;
   a second longitudinal segment extending the first longitudinal segment and suitable for forming an airfoil portion; and
   at least one transverse segment extending transversely from a junction between the first and second longitudinal segments and suitable for forming a tongue for a platform;
   wherein the at least one transverse segment extends axially over a length that is less than 30% of a length of the junction between the first and second longitudinal segments.

2. A preform according to claim 1, wherein the at least one transverse segment includes a plurality of transverse segments extending transversely in a same direction from the junction between the first and second longitudinal segments and suitable for forming tongues for a common platform;
   wherein said longitudinal segments are spaced apart from one another.

3. A preform according to claim 1, wherein the main fiber structure further includes at least one additional transverse segment extending transversely from the junction between the first and second longitudinal segments, in a direction opposite to the at least one transverse segment, and suitable for forming a tongue for a second platform.

4. A preform according to claim 1, wherein the at least one transverse segment extends axially from a front end of the junction between the first and second longitudinal segments.

5. A preform according to claim 1, wherein the at least one transverse segment extends axially from a rear end of the junction between the first and second longitudinal segments.

6. A preform according to claim 1, wherein the at least one transverse segment is formed by at least a portion of a free flap said free flap and said second longitudinal segment being woven jointly in a non-interlinked manner, said non-interlinking starting at the junction between the first and second longitudinal segments.

7. A preform according to claim 1, further comprising at least one fiber strip, that is woven independently of the main fiber structure, and that is of a width substantially equal to the length of the junction between the first and second longitudinal segments, and that is suitable for forming a platform.

8. A preform according to claim 7, wherein the fiber strip is fitted to the at least one transverse segment or at least one additional transverse segment of the main fiber structure by being put against a bottom surface of said at least one transverse segment or the at least one additional transverse segment.

9. A preform according to claim 7, wherein a top surface of the fiber strip is flush with a top surface of the at least one transverse segment or the at least one additional transverse segment.

10. A preform according to claim 1, wherein the at least one transverse segment extends axially over a length that is less than 15% of the length of the junction between the first and second longitudinal segments.

11. A turbine engine blade comprising:
    a blade root;
    an airfoil portion; and
    a platform extending transversely to the airfoil portion at a level of a junction between the blade root and the airfoil portion;
    said blade being characterized in that it is made as a single piece of composite material by means of a fiber preform according to claim 1, said preform being shaped in a mold and embedded in a matrix.

12. A turbine engine fan, characterized in that it comprises a plurality of blades according to claim 11.

13. A turbine engine, characterized in that it includes at least one blade according to claim 11.

* * * * *